(12) United States Patent
Lee et al.

(10) Patent No.: US 9,311,172 B2
(45) Date of Patent: Apr. 12, 2016

(54) EXTERNAL ELECTRONIC DEVICE

(71) Applicant: ASUSTeK COMPUTER INC., Taipei (TW)

(72) Inventors: Meng-Hsiung Lee, Taipei (TW); Pai-Ching Huang, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 293 days.

(21) Appl. No.: 13/962,964

(22) Filed: Aug. 9, 2013

(65) Prior Publication Data

US 2014/0164755 A1 Jun. 12, 2014

(30) Foreign Application Priority Data

Dec. 12, 2012 (TW) .............................. 101146926 A

(51) Int. Cl.
*G06F 9/00* (2006.01)
*G06F 11/00* (2006.01)
*G06F 11/07* (2006.01)
*G06F 11/14* (2006.01)

(52) U.S. Cl.
CPC ........ *G06F 11/0706* (2013.01); *G06F 11/0757* (2013.01); *G06F 11/1417* (2013.01)

(58) Field of Classification Search
CPC ............ G06F 11/0757; G06F 11/1417; G06F 11/1441
See application file for complete search history.

(56) References Cited

U.S. PATENT DOCUMENTS

| | | | |
|---|---|---|---|
| 5,564,054 A * | 10/1996 | Bramnick et al. ................. 713/2 |
| 5,867,154 A * | 2/1999 | Berstis et al. ................. 715/788 |
| 6,438,709 B2 * | 8/2002 | Poisner ............................ 714/23 |
| 6,567,912 B1 * | 5/2003 | Belkin et al. ........................ 713/2 |
| 6,934,881 B2 * | 8/2005 | Gold et al. ......................... 714/15 |
| 7,111,202 B2 * | 9/2006 | Cagle et al. ....................... 714/36 |
| 7,146,525 B2 * | 12/2006 | Han et al. ...................... 714/6.11 |
| 7,194,659 B2 * | 3/2007 | Buchanan et al. ............... 714/36 |
| 7,779,310 B2 * | 8/2010 | Wei et al. ......................... 714/55 |
| 7,783,877 B2 | 8/2010 | Lu |
| 7,975,188 B2 | 7/2011 | Saito |
| 8,055,889 B2 | 11/2011 | Lee et al. |
| 8,405,666 B2 * | 3/2013 | Masood ......................... 345/530 |
| 8,543,801 B2 | 9/2013 | Chu et al. |

(Continued)

FOREIGN PATENT DOCUMENTS

| | | |
|---|---|---|
| CN | 101271413 A | 9/2008 |
| CN | 101488090 A | 7/2009 |

(Continued)

*Primary Examiner* — Mark Connolly
(74) *Attorney, Agent, or Firm* — CKC & Partners Co., Ltd.

(57) ABSTRACT

A computer system and its booting and setting method are disclosed. Power supplying and a booting process of the computer system are controlled by a basic input/output system (BIOS). The computer system includes a super input/output chip, a south bridge chipset, and a power supply module. The super input/output chip includes a timer. A counting time is set by the BIOS and the timer counts down when booting the computer system, wherein the counting time is longer than a normal booting time. The south bridge chipset is electrically connected with the super input/output chip and exchanges data between a south bridge chipset and a peripheral device. The power supply module is used for providing power to the computer system. The BIOS controls the timer to stop counting down when the computer system is capable of booting normally.

11 Claims, 6 Drawing Sheets

(56) References Cited

U.S. PATENT DOCUMENTS

| | | | |
|---|---|---|---|
| 2001/0042198 A1* | 11/2001 | Poisner | 713/2 |
| 2003/0005275 A1* | 1/2003 | Lam | 713/2 |
| 2004/0210751 A1* | 10/2004 | Wang | 713/1 |
| 2008/0215868 A1 | 9/2008 | Lee et al. | |
| 2009/0222635 A1* | 9/2009 | Challener et al. | 711/166 |
| 2010/0211767 A1 | 8/2010 | Chu et al. | |
| 2011/0022826 A1* | 1/2011 | More et al. | 713/1 |
| 2013/0080757 A1* | 3/2013 | Chou | 713/2 |
| 2014/0039729 A1* | 2/2014 | Puig-Suari et al. | 701/3 |

FOREIGN PATENT DOCUMENTS

| | | |
|---|---|---|
| CN | 101799778 A | 8/2010 |
| TW | 200844859 A | 11/2008 |
| TW | 201032133 A | 9/2010 |
| TW | 201101012 A | 1/2011 |
| TW | I361381 B | 4/2012 |

* cited by examiner

EXTERNAL ELECTRONIC DEVICE

CROSS-REFERENCE TO RELATED APPLICATION

This application claims the priority benefit of Taiwan application serial No. 101146926, filed on Dec. 12, 2012. The entirety of the above-mentioned patent application is hereby incorporated by reference herein and made a part of specification.

BACKGROUND OF THE INVENTION

1. Field of the Invention

The invention relates to a computer system and, more particularly, to a computer system controlled by a basic input/output device.

2. Description of the Related Art

More and more users assemble computers by themselves, and they usually manually set their computer to get better performance. The operation mode of the computer can be controlled by setting the basic input/output system (BIOS), such as the operating frequency. However, due to improper settings of the computer, the computer may crash and even cannot reboot after the host is shut down. Therefore, users cannot restore the BIOS by generally setting the BIOS.

If the host crashes due to improper settings, the longer the shutdown state remains, the much serious damage of internal components may be caused. Conventionally, the power button should be pressed to cut off a power supply, and power lines of a power supply should be disconnected from the socket; another method is to open the casing of the computer and connect the jumper to a specific pin of the front panel of the motherboard to clear/reset basic setting values of the computer, which is usually called "clearing CMOS". However, the sequence of clearing the basic setting values of the computer system is rather troublesome, and the computer may be damaged and cannot reboot due to a careless operation.

On the other hand, if the computer setting values is suitable and can improve the performance of the computer, the computer system should finish the booting process and operate under these setting values, and the setting values does not need to be cleared.

BRIEF SUMMARY OF THE INVENTION

According to an embodiment of the invention, power supplying and a booting process of the computer system are controlled by a basic input/output system. The computer system includes a super input/output chip, a south bridge chipset, and a power supply module. The super input/output chip includes a timer. A counting time is set by the BIOS and the timer counts down when booting the computer, wherein the counting time is longer than a normal booting time. The south bridge chipset is electrically connected with the super input/output chip and exchanges data between a host and a peripheral device. The power supply module is used for providing power to the computer system. The BIOS controls the timer to stop counting down when the computer system is capable of booting normally.

According to another embodiment of the invention, power supplying and booting of the computer system are controlled by a basic input/output system. The computer system booting and setting method includes the following steps: setting a counting time of a timer of a super input/output chip when the computer system boots, wherein the counting time is longer than a normal booting time counting down by the timer; stopping the timer counting down when the computer system boots normally.

The computer system and its booting and setting method disclosed in these embodiments can avoid entering the power-off process when the computer system can normally boot and provide power to the computer system to support it to normally operate.

DETAILED DESCRIPTION OF THE EMBODIMENTS

These and other features, aspects, and advantages of the invention will become better understood with regard to the following description, appended claims, and accompanying drawings.

According to the Advanced Configuration and Power Interface (ACPI) specification, computer operation states can be divided into S0 to S5. In state S0, the computer operates normally and all hardware devices are active or operate normally; the S1 state is also called a POS (Power on Suspend) state, and the CPU stops operating and other hardware devices normally operate. In state S2, the CPU is powered-off and other hardware devices normally operate; the S3 state is usually also called a STR (Suspend to RAM) state, and operating information is temporary stored in the RAM; S4 is called STD (Suspend to Disk), and the operating information is temporary stored in the hard disk and all hardware devices stop operating.

All hardware devices are powered of in the S5 state, that is, the computer is power off. However, in the S5 state, a power supply module still provides standby power to a super input/output (I/O) chip, a south bridge chipset, and a network chip of the computer system to ensure the computer can be powered on. In the embodiment of the invention, when the computer system cannot normally boot, the standby power is cut off to reset a plurality of setting values of the computer system to make the computer system normally boot.

Figure 1:
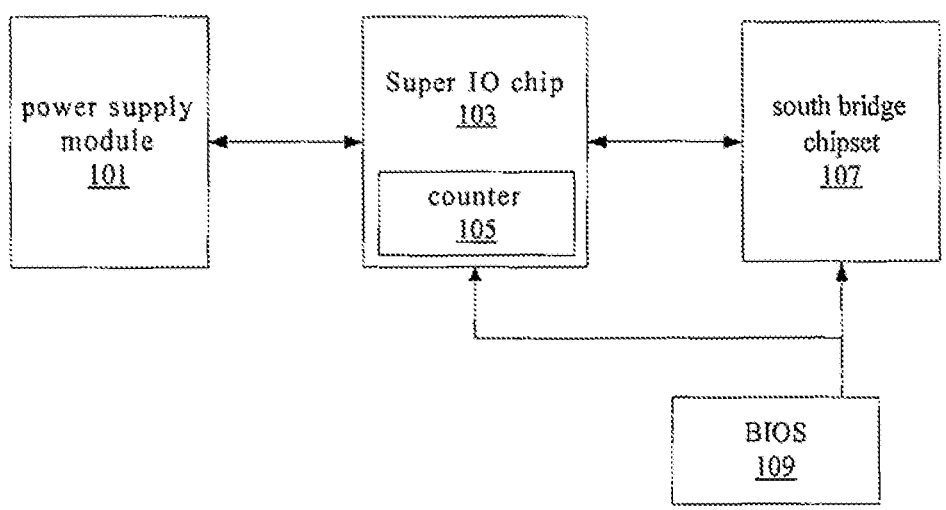
FIG. 1 is a block diagram showing a computer system in an embodiment.

Please refer to FIG. 1. FIG. 1 is a block diagram showing a computer system in an embodiment. A basic input/output system (BIOS) 109 controls the power supply and the booting process of the computer system 100. The computer system 100 includes a power supply module 101, a super input/output chip 103, a south bridge chipset 107, and the BIOS 109. In the embodiment, the south bridge chipset 107 is electrically connected with the super input/output chip 103, and exchanges data between a host and a peripheral device. The power supply module 101 provides power to the computer system 100.

The super input/output chip 103 includes a timer 105 which counts down when booting the computer, and a counting time is set by the basic input/output system 109. When the computer system 100 normally boots (that is to say, the computer system enters an operating system after it finishes executing the initialization process and the BIOS process), the basic input/output system 109 controls the timer 105 to stop counting down to avoid that the computer system 100 wrongly enters the power-off process.

The counting time of the timer 105 should be set to be longer than a normal booting time. When the computer can normally boot, the counting time is enough. Consequently, the counting time would run out before the computer system 100 finishes executing a normal booting process.

If the computer system 100 does not normally boot after the counting time runs out, a power-off process is executed, and the power supply module 101 stops providing power to the computer system 100. In the embodiment, the power-off process controls the power supply module 101 not providing standby power to the computer system.

When the power-off process is executed, the setting values of the computer system are cleared and are set to initial values. The setting values includes bridge setting values, clock generating circuit setting values, and voltage control setting values, which can be cleared, by the basic input/output system or by the corresponding circuits themselves to restore the computer system to an initial state, and then the computer system can normally boot. After the power-off process, a reboot signal is sent to reboot the computer system 100. The reboot signal may be sent by the super input/output chip 103.

Figure 2A:
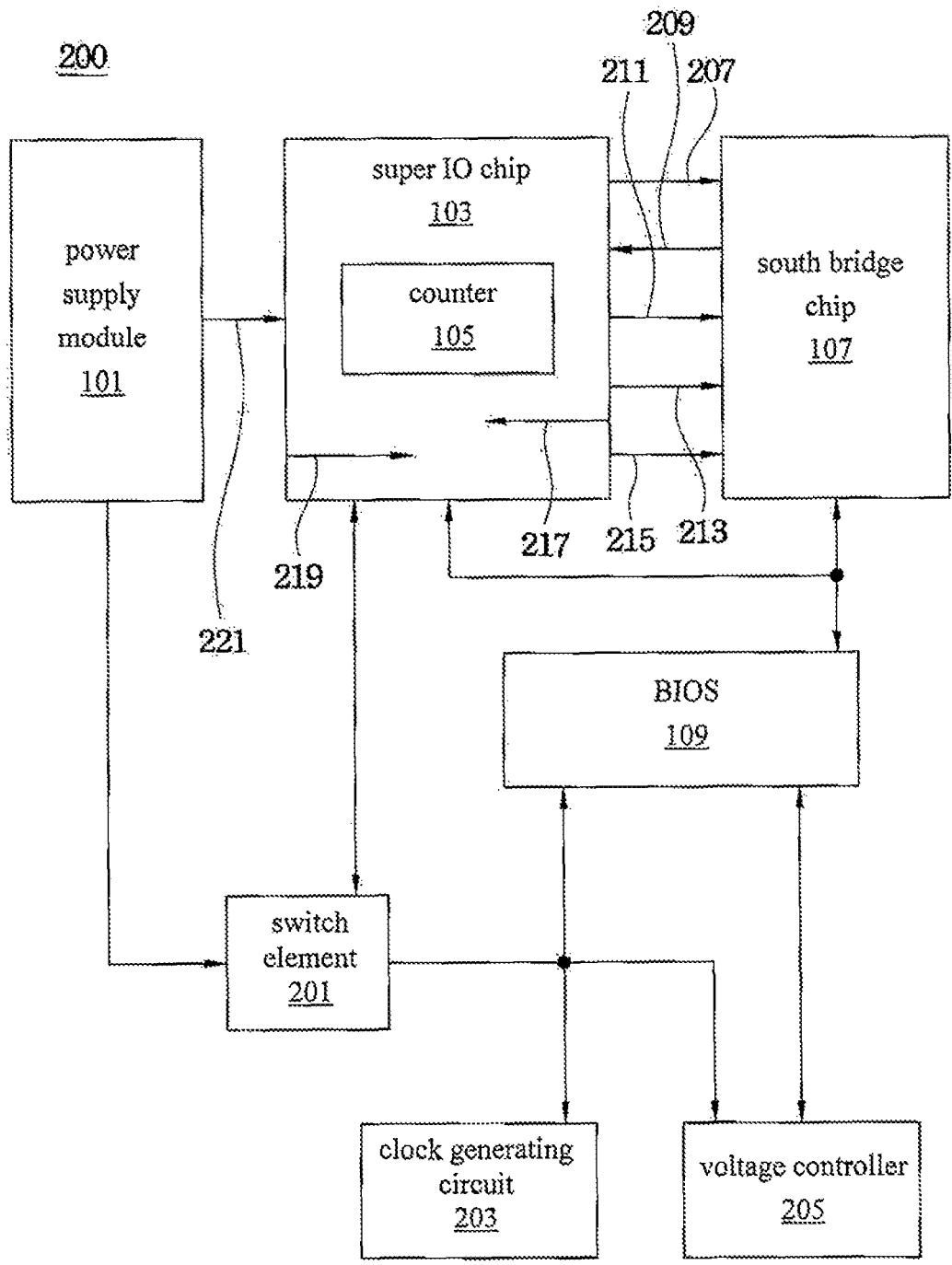
FIG. 2A is a block diagram showing the computer system in another embodiment.
Figure 2B:
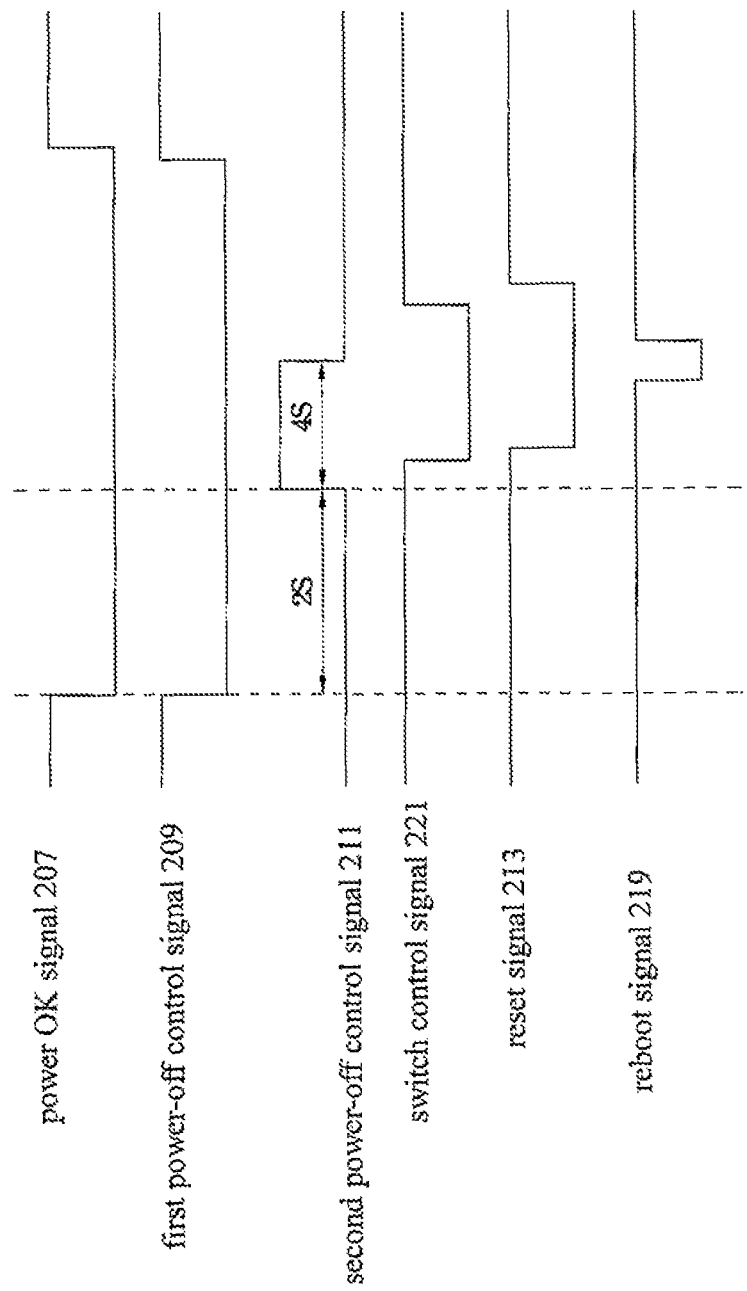
FIG. 2B is a signal sequence diagram showing steps of a power-off process of a computer system in an embodiment.
Figure 2C:
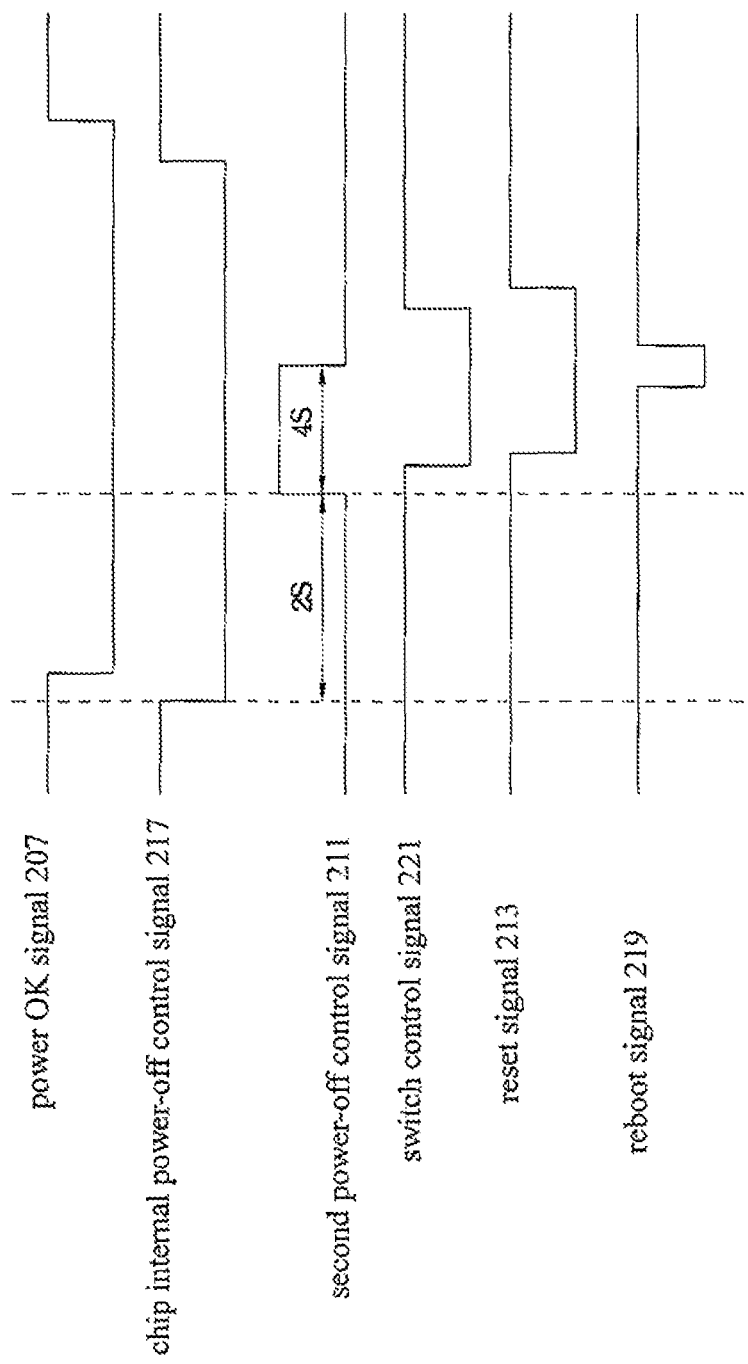
FIG. 2C is a signal sequence diagram showing steps of the power-off process of a computer system in another embodiment.

Please refer to FIG. 2A to FIG. 2C which are signal sequence diagrams showing steps of a power-off process of a computer system in other embodiment. The computer system 200 includes a power supply module 101, a super input/output chip 103, a south bridge chipset 107, and a basic input/output system 109. Operating modes of these circuits and modules are similar to those in FIG. 1. Except for these circuits, the computer system 200 in this embodiment thither includes a clock generating circuit 203, a switch element 201, and a voltage controller 205.

The clock generating circuit 203 generates a clock signal according to a plurality of clock setting values. The clock signal has a predetermined frequency and is transferred to each circuit of the computer system 200. The clock setting values are used to control the predetermined frequency of the clock signal. The voltage controller 205 generates a voltage signal according to a plurality of voltage setting values which are used to adjust the voltage of the voltage signal. For example, the voltage is changed from high to low, or from low to high.

The switch element 201 is controlled by the super input/output chip 103. The switch element 201 makes the power supply module 101 stop providing power during the power-off process in detail, the switch element 201 cuts the power from the power supply module 101 to the clock generating circuit 203, so as to make the clock setting values of the clock generating circuit 203 and the voltage setting values of the voltage controller 205 reset to the initial setting values.

Figure 2D:
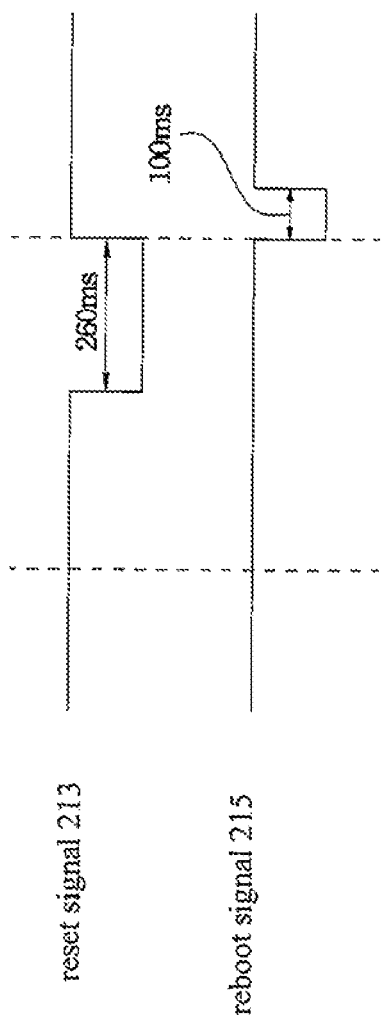
FIG. 2D is a signal sequence diagram showing steps of the power-off process of a computer system in another embodiment.

The super input/output chip 103 outputs a power OK signal (PWROK) 207, a second power-off control signal (O_DEEPS) 211, a reset signal (RSMRST) 213, and a reboot signal (PS_OUT) 215 to the south bridge chipset 107. The super input/output chip 103 also generates an internal power-off control signal (SIO internal SLP_S3#) 217 and a reboot signal (PSIN#) 219 to operate the time sequence in turning off the power supply and reboot the computer system 200. The south bridge chipset 107 feedbacks a first power-off control signal (SLP_S3#) 209 to the super input/output chip 103. In an embodiment, the sequence of these signals are shown in FIG. 2B to FIG. 2D.

In FIG. 2B, the signal sequence diagram shows steps of a power-off process, the power OK signal (PWRO) 207 indicates the state of the power. The power OK signal 207 is sent and controlled by the super input/output chip 103. High voltage of the power OK signal 207 indicates that the power is stable, for example, the power is stable at 3V or 5V. Low voltage of the power OK signal 207 indicates that the computer system 200 will shut down or already shuts down, and the power supply module 101 stops providing power to the computer system.

When the computer system 200 needs to enter the power-off process, the super input/output chip 103 changes the voltage of the power OK signal 207 from high to low and informs each device of the computer system 200 to get ready that the power is going to be cut. Then, it waits for a delay time which can be adjusted according to the actual situation such as about 2 seconds. When the south bridge chipset 107 detects that the voltage of the power OK signal 207 is changed, the voltage of the first power-off control signal (SLP_S3# signal) 209 is changed from high to low, and it will inform that the main power will be cut off, the first power-off control signal 209 is given feedback from the south bridge chipset 107 to the super input/output chip 103.

After the change of the voltage of the first power-off control signal (SLP_S3# signal) 209 is detected, the super input/output chip 103 changes the voltage of the second power-off control signal (O_DEEPS5) 211 from low to high; the voltage change of the second power-off control signal 211 makes that the voltage of the switch control signal (3 VSB) 221 (sent by the power supply module 101) changed to low (0V), which indicates that the standby power is going to be cut off. Then the low voltage of the switch control signal 221 triggers that the reset signal (RSMRST#) 213 is changed from high to low, and the low voltage of the reset signal 213 drives the south bridge chipset 107 to be power off.

When it detects that that the voltage of the reset signal (RSMRST# signal) 213 decreases to low voltage, the computer system 200 starts to clear the setting values of the computer system 200 to restore to an initial setting state, and it sends a reboot signal 219 after the power-off process to generate a low voltage pulse to reboot the computer system 200.

In another embodiment shown in FIG. 2C, in the step of entering the power-off process, the voltage of the internal power-off control signal (SIO internal SLPS_S3#) 217 is changed from high to low. The voltage change of the internal power-off control signal 217 informs the super input/output chip 103 to get ready for entering the power-off process, for example, data needs to be stored. After a delay time, the internal power-off control signal 217 with low voltage makes the power OK signal 207 to change from high voltage to low voltage. Then, the second power-off control signal (O_DEEPS5) 211 is controlled to change from low voltage to high voltage. The signal sequence of the subsequent power-off process is the same as the signal sequence in FIG. 2B. The reboot signal 219 is sent after the power-off process to reboot the computer system 200.

In further another embodiment shown in FIG. 2D, in the steps of a power-off process, the reset signal (RSMRST#) 213 is changed from high voltage to low voltage, and then the computer system 200 enters the power-off process. After the reset signal 213 remains at the low voltage for a period, such as about 260 ms, the super input/output chip 103 makes the reboot signal 215 to generate a low voltage pulse to inform the computer system 200 to reboot, the low voltage pulse may be kept for about 100 ms.

Figure 3:
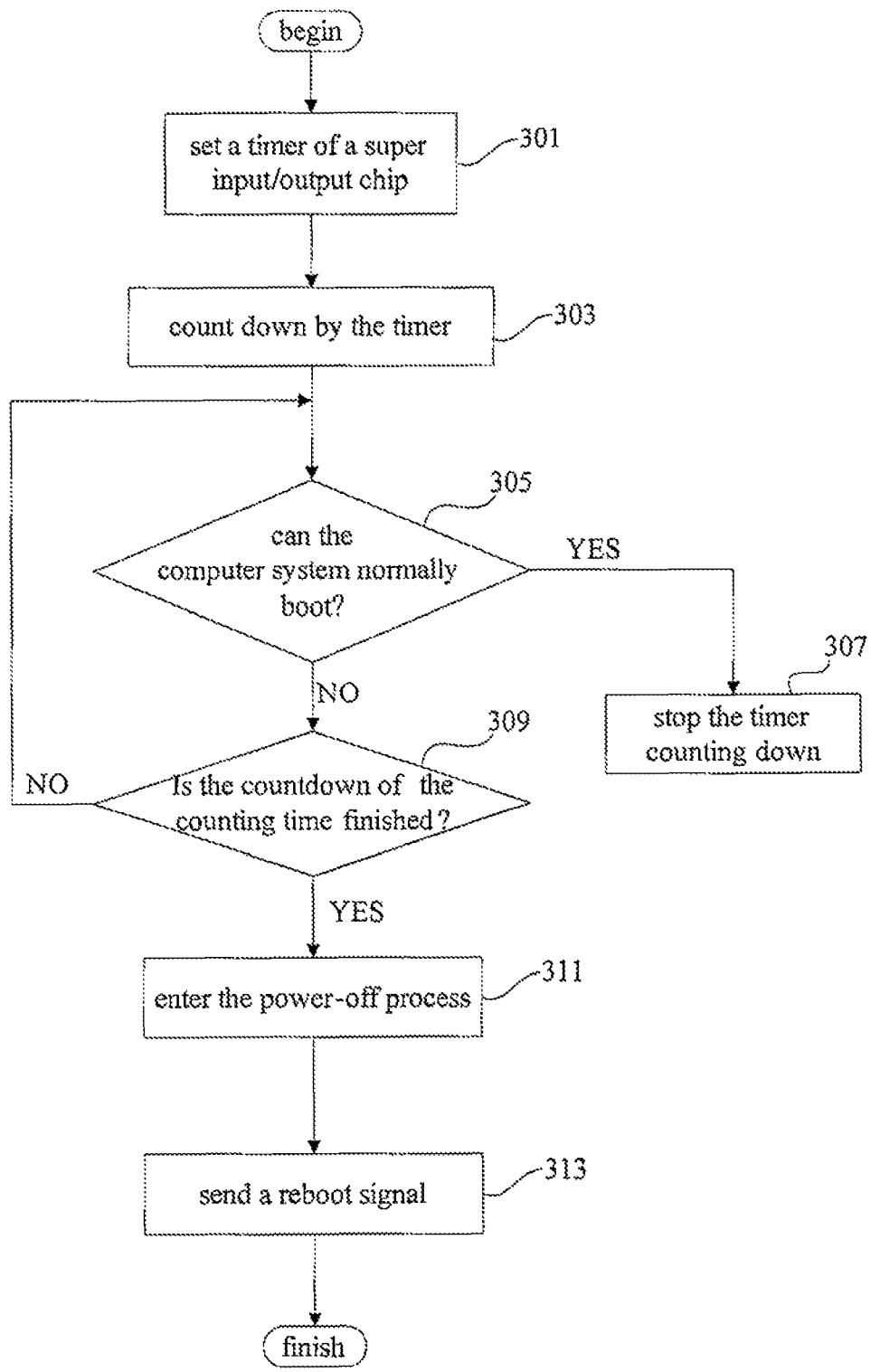
FIG. 3 is a flow chart showing, a computer system booting and setting method in an embodiment of the invention.

Please refer to FIG. 3. It is a flow chart showing a computer system booting and a setting method in an embodiment of the invention. The power supplying and booting process of the computer system are controlled by a basic input/output system. The method includes following steps: setting a timer of a super input/output chip (step 301), and a counting time of the timer is longer than a normal booting time, and thus it can avoid the computer system wrongly enters a power-off process before the computer system 100 finishes executing a normal booting process because the countdown is finished; counting down after setting the counting time by the timer (step 303); detecting whether the computer system can normally boot (step 305); stopping the timer counting down when the computer system boots normally (step 307); if the computer system does not boot normally, waiting the counting down timer and detecting whether the countdown of the counting time finished (step 309).

When the countdown of the counting time is finished, the computer system enters the power-off process (step 311), the power supply module of the computer system stops providing power, and setting values of the computer system are reset to initial setting values. The setting values of the computer system includes south bridge chipset setting values, clock generating circuit setting, values, and voltage control setting values. A reboot signal is sent after the power-off process is finished to reboot the computer system (step 313).

The computer system and its booting and setting method disclosed in these embodiments can avoid, that the computer system enters the power-off process when the computer system can normally boot, and the power is provided, to the computer system to make the computer system normally operate. On the other hand, when the computer system cannot boot normally, the computer system is controlled to enter the power-off process, setting values of the computer system are reset to initial setting values to reboot the computer system, and the computer system restore to the initial state to enter the operation system normally for user operating.

Although the present invention has been described in considerable detail with reference to certain preferred embodiments thereof, the disclosure is not for limiting the scope. Persons having ordinary skill in the art may make various modifications and changes without departing from the scope. Therefore, the scope of the appended claims should not be limited to the description of the preferred embodiments described above.

What is claimed is:

1. A computer system, wherein power supplying and a booting process of the computer system are controlled by a basic input/output system (BIOS), comprising:
 a super input/output chip including a timer, wherein a counting time is set by the BIOS and the timer counts down when booting the computer system, and the counting time is longer than a normal booting time;
 a south bridge chipset electrically connected with the super input/output chip and exchanging data between a host and a peripheral device; and
 a power supply module used for providing power to the computer system,
 wherein the BIOS controls the timer to stop counting down when the computer system is capable of booting normally, a power-off process is executed to control the power supply module to stop providing power when the counting time is up, the super input/output chip sends a reboot signal to reboot the computer system after the power-off process is completed.

2. The computer system according to claim 1, wherein a plurality of computer system setting values are set to initial values when the power-off process is executed.

3. The computer system according to claim 1, wherein the south bridge resets a plurality of bridge setting values to initial values when the power-off process is executed.

4. The computer system according to claim 1, further comprising:
 a clock generating circuit, used for generating a clock signal according to a plurality of clock setting values, wherein the clock setting values are used for controlling the frequency of the clock signal; and
 a switch element controlled by the super input/output chip, wherein the switch element makes the power supply module stop providing power to the clock generating, circuit and resets the clock setting values to initial setting values when the power-off process is executed.

5. The computer system according to claim 4, further comprising;
 a voltage controller, used for generating a voltage signal according to a plurality of voltage setting values, wherein the voltage setting values are used for adjusting the voltage of the voltage signal,
 wherein the switch element makes the power supply module stop providing power to the voltage controller and resets the voltage setting values to initial setting values when the power-off process is executed.

6. A computer system booting and setting method, wherein power supplying and booting of the computer system are controlled by a basic input/output system, the method comprising:
 setting a counting time of a tinier of a super input/output chip when the computer system boots, wherein the counting time is longer than a normal booting time;
 counting down by the timer;
 stopping the timer counting down when the computer system boots normally;
 making the computer system enter a power-off process when the counting time is up; and
 sending a reboot signal after the power-off process is completed to reboot the computer system;
 wherein the step of entering a power-off process includes:
  changing a power OK signal from high voltage to low voltage;
  changing a second power-off control signal from low voltage to high voltage; and
  waiting until a switch control signal and a reset signal are changed from high voltage to low voltage,
 wherein the computer system executes the power-off process when the switch control signal and the reset signal are changed from high voltage to low voltage.

7. The computer system booting and setting method according to claim 6, wherein the power-off process makes a power supply module stop providing power to the computer system.

8. The computer system booting and setting method according to claim 6, wherein the step of entering a power-off process includes:
 changing a internal power-off control signal from high voltage to low voltage;
 waiting for a delay time;
 changing a second power-off control signal from low voltage to high voltage; and
 waiting until a switch control signal and a reset signal are changed from high voltage to low voltage, wherein the power-off process is executed by the computer system when the switch control signal and the reset signal changing from high voltage to low voltage.

9. The computer system booting and setting method according to claim 6, wherein the step of entering a power-off process includes:

changing a reset signal from high voltage to low voltage.

10. The computer system booting and setting method according to claim 6, wherein a plurality of computer system setting values are reset to the initial setting values during the power-off process.

11. The computer system booting and setting method according to claim 10, wherein the computer system setting values includes south bridge setting values, clock generating circuit setting values, and voltage control setting values.

* * * * *